(12) United States Patent
Koepp et al.

(10) Patent No.: US 8,201,748 B2
(45) Date of Patent: Jun. 19, 2012

(54) PACKAGED RFID IC WITH INTEGRATED ANTENNA

(75) Inventors: Ronald L. Koepp, Seattle, WA (US);
Ronald A. Oliver, Seattle, WA (US);
Jay Fassett, Edmonds, WA (US);
Christopher J. Diorio, Shoreline, WA (US)

(73) Assignee: Impinj, Inc., Seattle, WA (US)

( * ) Notice: Subject to any disclaimer, the term of this patent is extended or adjusted under 35 U.S.C. 154(b) by 96 days.

(21) Appl. No.: 12/767,220

(22) Filed: Apr. 26, 2010

(65) Prior Publication Data

US 2010/0270382 A1 Oct. 28, 2010

Related U.S. Application Data

(60) Provisional application No. 61/173,107, filed on Apr. 27, 2009.

(51) Int. Cl.
*G06K 5/00* (2006.01)

(52) U.S. Cl. .............. 235/492; 235/472.02; 235/487
(58) Field of Classification Search ............ 235/492, 235/487, 462.46, 472.02; 343/895
See application file for complete search history.

(56) References Cited

U.S. PATENT DOCUMENTS

| | | | |
|---|---|---|---|
| 2005/0007296 A1* | 1/2005 | Endo et al. | 343/895 |
| 2007/0169336 A1* | 7/2007 | Luch | 29/601 |
| 2008/0315992 A1* | 12/2008 | Forster | 340/10.1 |

* cited by examiner

*Primary Examiner* — Daniel StCyr
(74) *Attorney, Agent, or Firm* — Turk IP Law, LLC

(57) ABSTRACT

A precursor for a Radio Frequency Identification (RFID) tag includes a conductive lead frame with at least three segments, an RFID Integrated Circuit (IC) with at least two antenna terminals, and at least two jumpers. The RFID IC is mounted on at least one of the segments. The antenna terminals are electrically coupled to at least two of the segments, and the jumpers electrically couple the segments such that the coupled segments form a two-turn coil between the antenna terminals of the RFID IC.

20 Claims, 15 Drawing Sheets

EXAMPLE LEADFRAME FOR
2-LOOP RFID PRECURSOR

*RFID SYSTEM*

*RFID TAG*

*RFID TAG COMPONENTS*

*SIGNAL PATH DURING R→T*

*SIGNAL PATH DURING T→R*

RIFD IC AND LEAD FRAME
BEFORE ENCAPSULATION & TRIM

EXAMPLE LEADFRAME FOR
2-LOOP RFID PRECURSOR

EXAMPLE 2-LOOP PRECURSOR INCLUDING
A LEAD FRAME, CONNECTING JUMPERS,
AND AN RFID IC AND ITS COUPLINGS

EXAMPLE 2-LOOP PRECURSOR INCLUDING
A LEAD FRAME, CONNECTING JUMPERS,
AND AN RFID IC AND ITS COUPLINGS

EXAMPLE 2-LOOP PRECURSOR INCLUDING
A LEAD FRAME, CONNECTING JUMPERS,
AND AN RFID IC AND ITS COUPLINGS

EXAMPLE 2-LOOP PRECURSOR INCLUDING
A LEAD FRAME, CONNECTING JUMPERS,
AND AN RFID IC AND ITS COUPLINGS

EXAMPLE 2-LOOP PRECURSOR INCLUDING A LEAD FRAME, CONNECTING JUMPERS, AN RFID IC AND ITS COUPLINGS, AND A TRIM LINE

CROSS-SECTION OF EXAMPLE
ENCAPSULATED RFID IC AND
LEADFRAME

CROSS-SECTION OF EXAMPLE
ENCAPSULATED FLIP RFID IC AND
LEADFRAME

EXAMPLE 2-LOOP PRECURSOR
ATTACHED TO ANTENNA

PACKAGED RFID IC WITH INTEGRATED ANTENNA

This application claims the benefit of U.S. Provisional Patent Application Ser. No. 61/173,107 filed on Apr. 27, 2009. The disclosures of the provisional patent application are hereby incorporated by reference for all purposes.

BACKGROUND

Radio Frequency Identification (RFID) systems typically include RFID tags and RFID readers. RFID tags are also known as RFID transponders. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its label or package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna and tag electronics including a radio section, a power management section, and frequently a logical section and a memory. In some RFID tags the power management section includes a chemical energy storage device, such as a battery. RFID tags with a chemical energy storage device are known as active or battery-assisted tags. Advances in semiconductor technology have miniaturized the electronics so much that an RFID tag can be powered solely by the RF signal it receives. Such RFID tags do not include an energy storage device such as a battery, and are called passive tags. Passive tags often integrate the miniaturized electronics into an RFID Integrated Circuit (IC or RFID IC). Regardless of the type, all tags typically store or buffer some energy temporarily in passive storage devices such as capacitors.

Conventional RFID tag manufacturing processes include connecting the RFID IC to the antenna(s) using conductive epoxy. In general, attaching a bare RFID IC to an antenna leaves the chip exposed and vulnerable to mechanical damage. Using conductive epoxy leaves the inlay vulnerable to thermally induced failure.

The terminals of an RFID IC typically expose an input which is capacitive, and which must be compensated by an inductive tuning element at an operating frequency of the tag. Conventional matching circuits use a conductive loop, which is a part of the antenna. Unfortunately, in some types of tags, such as those that use slot antennas, it is difficult to build the loop into the antenna, resulting in compromised antenna designs or costly inductors that are attached to the antenna along with the RFID IC.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to a precursor comprising an RFID IC coupled to a conductive coil, the coil acting as an inductive tuning element, the coil formed from two or more conductive loops, the loops formed from three or more segments of a lead frame. The multiple lead-frame segments are electrically connected via jumpers to form the loops. The terminals of the RFID IC are coupled to the coil, in some implementations also using jumpers. In some embodiments the RFID IC is mounted onto the lead frame; in other embodiments it is separate from the lead frame. The precursor is encapsulated in a non-conductive material thereby forming a package, the package optionally exposing one or more conductive leads on its exterior. The coil may act as a small antenna suitable for short-range RFID communications, allowing the precursor to act as an RFID tag. Alternatively, or additionally, the precursor may be coupled to one or more external antennas to form an RFID tag. The coupling to the external antennas may be conductive or capacitive. The precursor encapsulates and protects the RFID IC, includes the tuning element, and is compatible with standard lead-frame-based package construction.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
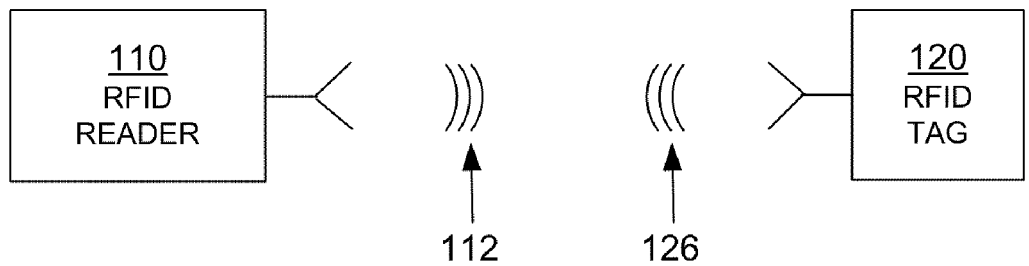
FIG. 1 is a block diagram of components of an RFID system.

FIG. 1 is a diagram of components of a typical RFID system 100, incorporating embodiments. An RFID reader 110 transmits an interrogating Radio Frequency (RF) wave 112. RFID tag 120 in the vicinity of RFID reader 110 may sense interrogating RF wave 112 and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 2.4 GHz, and so on.

Encoding the data can be performed in a number of ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the symbols are processed internally by reader 110 and tag 120, they can be equivalently considered and treated as numbers having corresponding values, and so on.

Tag 120 can be a passive tag, or an active or battery-assisted tag (i.e., having its own power source). Where tag 120 is a passive tag, it is powered from wave 112.

Figure 2:
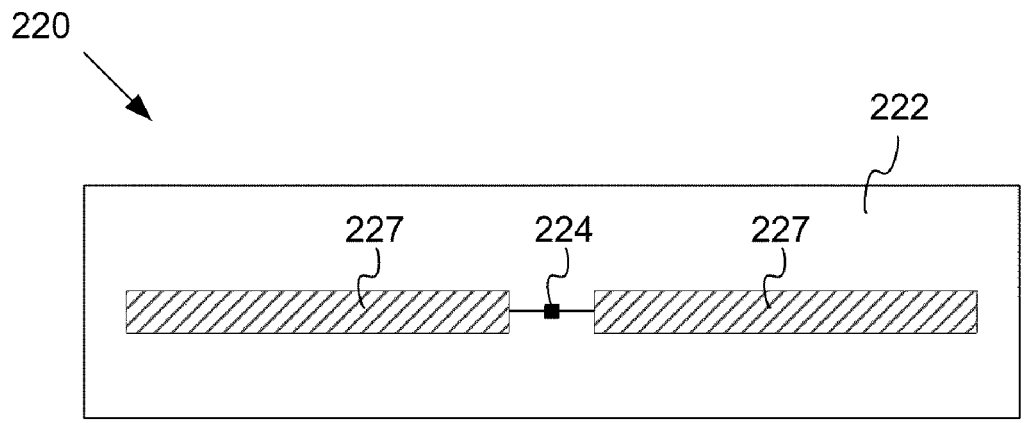
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active and battery-assisted tags.

Tag 220 is formed on a substantially planar inlay 222, which can be made in many ways known in the art. Tag 220 includes an electrical circuit which is preferably implemented as an Integrated Circuit (IC) 224. IC 224 is arranged on inlay 222. IC 224 and its equivalents in other figures are referred to as an IC or an RFID IC herein.

Tag 220 also includes an antenna for exchanging wireless signals with the tag's environment. The antenna is usually flat and attached to inlay 222. IC 224 is electrically coupled to the antenna via suitable antenna terminals (not shown in FIG. 2).

The antenna may be made in a number of ways, as discussed in more detail below. In the example of FIG. 2, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna terminals of IC 224. For example, the antenna can form a single loop, with its ends coupled to the terminals. It should be remembered that, when the single segment has more complex shapes, even a single segment could behave like multiple segments at the frequencies of RFID wireless communication.

In some embodiments, particularly those that do not require long read range, the antenna segments can be miniaturized sufficiently to include them on IC 224, or within a package that may encapsulate IC 224. In such cases the IC or its package form tag 220, and a separate inlay 222 may not be required (not shown in FIG. 2).

In operation, a signal is received by the antenna and communicated to IC 224. IC 224 both harvests power, and responds if appropriate, based on the incoming signal and the IC's internal state. In order to respond by replying, IC 224 modulates the reflectance of the antenna, which generates backscatter 126 from wave 112 transmitted by the reader. Coupling together and uncoupling the antenna terminals of IC 224 can modulate the antenna's reflectance, as can a variety of other means.

The components of the RFID system of FIG. 1 may communicate with each other in any number of modes. One such mode is called full duplex. Another such mode is called half-duplex, and is described below.

Figure 3:
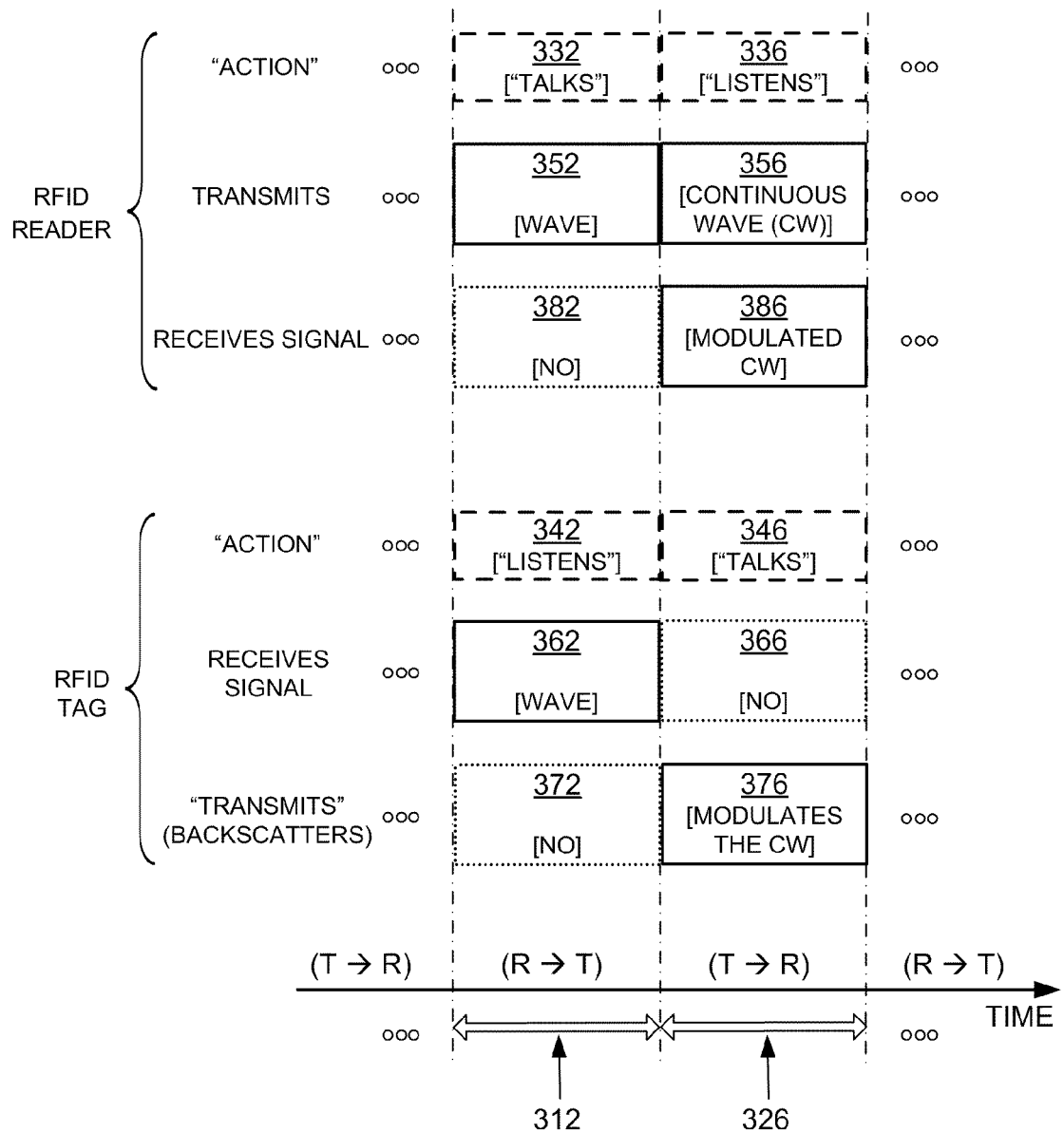
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326— here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described, in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

Figure 4:
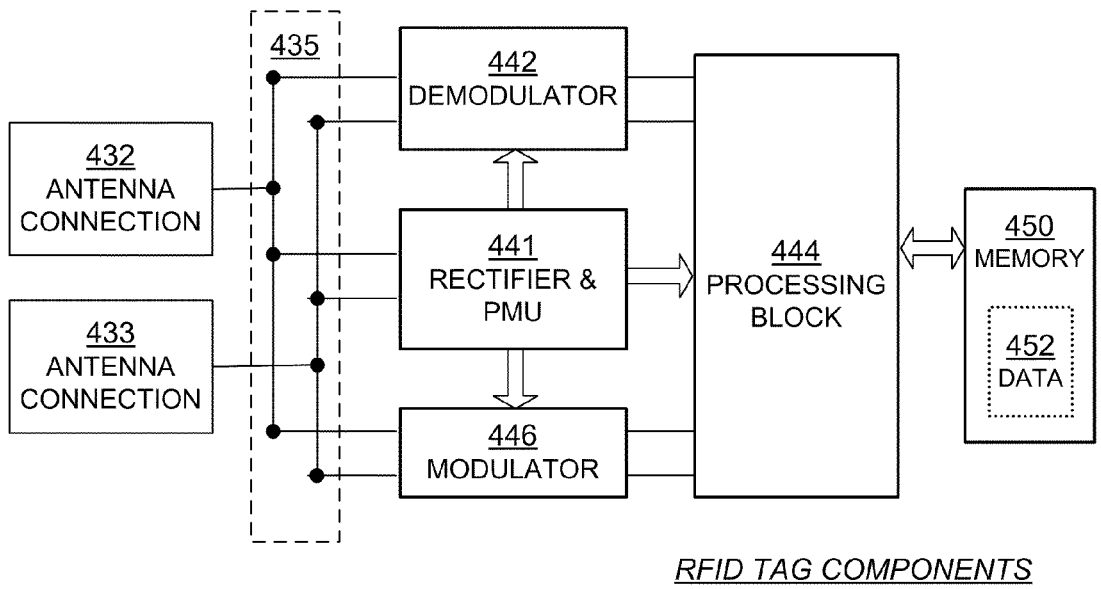
FIG. 4 is a block diagram showing a detail of an RFID tag, such as the one shown in FIG. 1.

FIG. 4 is a block diagram showing a detail of an RFID IC, such as the one shown in FIG. 2. Electrical circuit 424 in FIG. 4 may be formed in an IC of an RFID tag, such as IC 224 of FIG. 2. Circuit 424 has a number of main components that are described in this document. Circuit 424 may have a number of additional components from what is shown and described, or different components, depending on the exact implementation.

Circuit 424 includes at least two antenna terminals 432, 433, which are suitable for coupling to one or more antenna segments (not shown in FIG. 4), or for coupling to the terminals of a package which is, in turn, coupled to one or more antenna segments (not shown in FIG. 4). Antenna terminals 432, 433 may be made in any suitable way, such as using pads and so on. In a number of embodiments more than two antenna terminals are used, especially in embodiments where more antenna segments are used.

Circuit 424 includes a section 435. Section 435 may be implemented as shown, for example as a group of nodes for proper routing of signals. In some embodiments, section 435 may be implemented otherwise, for example to include a receive/transmit switch that can route a signal, and so on.

Circuit 424 also includes a Rectifier and PMU (Power Management Unit) 441. Rectifier and PMU 441 may be implemented in any way known in the art, for harvesting raw RF energy received via antenna terminals 432, 433. In some embodiments, block 441 may include more than one rectifier.

In operation, an RF wave received via antenna terminals 432, 433 is received by Rectifier and PMU 441, which in turn generates power for the electrical circuits of IC 424. This is true for either or both reader-to-tag (R→T) and tag-to-reader (T→R) sessions, whether or not the received RF wave is modulated.

Circuit 424 additionally includes a demodulator 442. Demodulator 442 demodulates an RF signal received via antenna terminals 432, 433. Demodulator 442 may be implemented in any way known in the art, for example including an attenuator stage, an amplifier stage, and so on.

Circuit 424 further includes a processing block 444. Processing block 444 receives the demodulated signal from demodulator 442, and may perform operations. In addition, it may generate an output signal for transmission.

Processing block 444 may be implemented in any way known in the art. For example, processing block 444 may include a number of components, such as a processor, memory, a decoder, an encoder, and so on.

Circuit 424 additionally includes a modulator 446. Modulator 446 modulates an output signal generated by processing block 444. The modulated signal is transmitted by driving antenna terminals 432, 433, and therefore driving the load presented by the coupled antenna segment or segments. Modulator 446 may be implemented in any way known in the art, for example including a driver stage, amplifier stage, and so on.

In one embodiment, demodulator 442 and modulator 446 may be combined in a single transceiver circuit. In another embodiment, modulator 446 may include a backscatter transmitter or an active transmitter. In yet other embodiments, demodulator 442 and modulator 446 are part of processing block 444.

Circuit 424 additionally includes a memory 450, which stores data 452. Memory 450 is preferably implemented as a Nonvolatile Memory (NVM), which means that data 452 is retained even when circuit 424 does not have power, as is frequently the case for a passive RFID tag.

In terms of processing a signal, circuit 424 operates differently during a R→T session and a T→R session. The different operations are described below, in this case with circuit 424 representing an IC of an RFID tag.

Figure 5A:
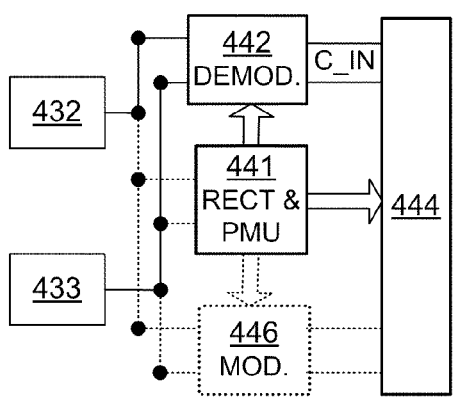
FIGS. 5A and 5B illustrate signal paths during tag-to-reader and reader-to-tag communications in the block diagram of FIG. 4.

FIG. 5A shows version 524-A of components of circuit 424 of FIG. 4, further modified to emphasize a signal operation during a R→T session (receive mode of operation) during time interval 312 of FIG. 3. An RF wave is received by antenna terminals 432, 433; a signal is demodulated by demodulator 442; and the demodulated signal is input to processing block 444 as C_IN. In one embodiment, C_IN may include a received stream of symbols.

Version 524-A shows as relatively obscured those components that do not play a part in processing a signal during a R→T session. Indeed, Rectifier and PMU 441 may be active, but only in converting raw RF power. And modulator 446 generally does not transmit during a R→T session. Modulator 446 typically does not interact with the received RF wave significantly, either because switching action in section 435 of FIG. 4 decouples the modulator 446 from the RF wave, or by designing modulator 446 to have a suitable impedance, and so on.

While modulator 446 is typically inactive during a R→T session, it need not be always the case. For example, during a R→T session, modulator 446 could be active in other ways. For example, it could be adjusting its own parameters for operation in a future session.

Figure 5B:
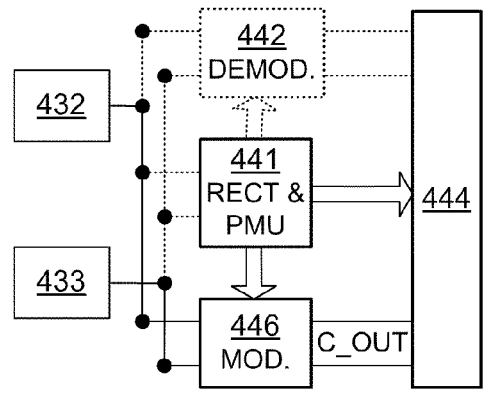

FIG. 5B shows version 524-B of components of circuit 424 of FIG. 4, further modified to emphasize a signal operation during a T→R session during time interval 326 of FIG. 3. A signal is output from processing block 444 as C_OUT. In one embodiment, C_OUT may include a stream of symbols for transmission. C_OUT is then modulated by modulator 446, and output as an RF wave via antenna terminals 432, 433.

Version 524-B shows as relatively obscured those components that do not play a part in processing a signal during a T→R session. Indeed, Rectifier and PMU 441 may be active, but only in converting raw RF power. And demodulator 442 generally does not receive during a T→R session. Demodulator 442 typically does not interact with the transmitted RF wave, either because switching action in section 435 decouples the demodulator 442 from the RF wave, or by designing demodulator 442 to have a suitable impedance, and so on.

While demodulator 442 is typically inactive during a T→R session, it need not be always the case. For example, during a T→R session, demodulator 442 could be active in other ways. For example, it could be adjusting its own parameters for operation in a future session.

Figure 6:
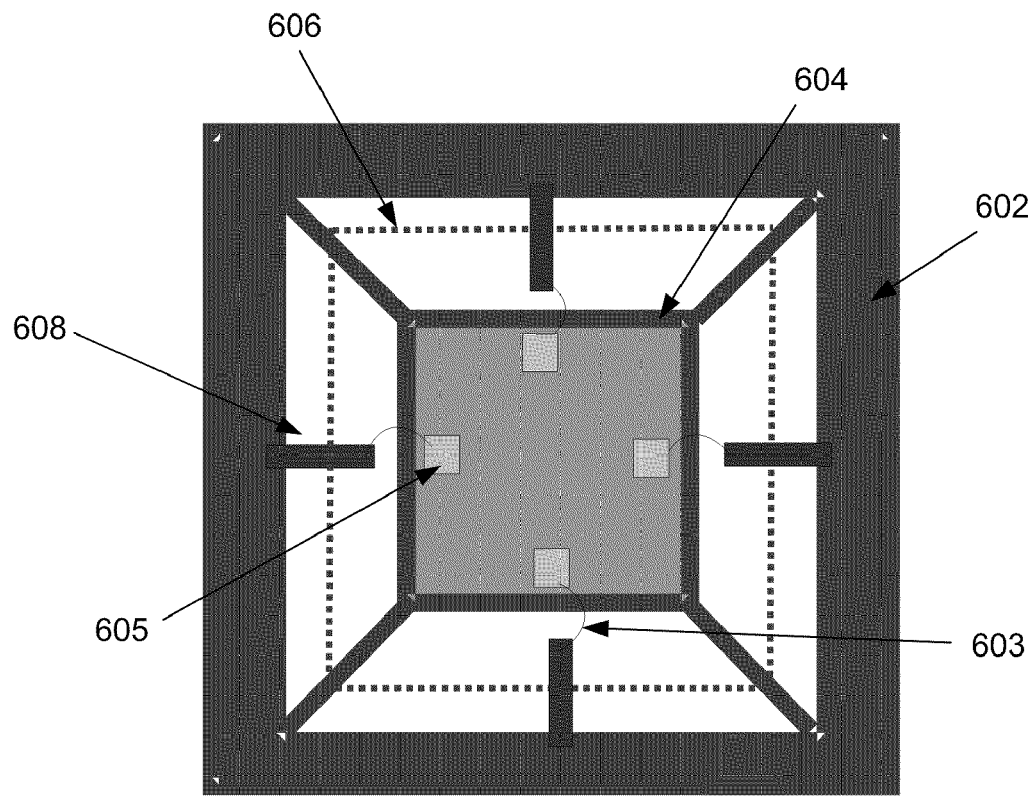
FIG. 6 illustrates a top view of an example RFID IC and lead frame before encapsulation (mold) and trim.

FIG. 6 illustrates a top view of an example RFID IC that is to be encapsulated into a package. FIG. 6 shows the RFID IC, a lead frame, and jumpers that couple the RFID IC to the lead frame. The jumpers in FIG. 6, as well as in other embodiments shown herein, are drawn as bond wires, but the present invention encompasses other types of jumpers such as ribbons, straps, circuit boards, wire-on-board, and other conductive elements as are well known to those skilled in the art. After assembling the IC onto the lead frame and attaching the jumpers, the assembly is molded into a package, and then the package is trimmed to its final form (not shown in FIG. 6).

Diagram 600 includes example RFID IC 604 mounted on a lead frame 602 according to a conventional method. Lead frame 602 has four pins 608 which may be used for antenna connections, data connections, test connections, and similar. Pins 608 are coupled to pads 605 of RFID IC 604 through jumpers 603.

During manufacturing, RFID IC 604 is mounted on lead frame 602, typically using an adhesive, and pads 605 are connected to pins 608 via jumpers. Then the RFID IC, lead frame, and jumpers are encapsulated in a non-conductive material. Finally, the outer structure of lead frame 602 may be removed by trimming (e.g. by sawing) along trim line 606. Packaged chip 600 does not include an antenna or a tuning element for the RFID IC, however, and must be connected to one or both before it can be used in actual RFID operations.

Figure 7:
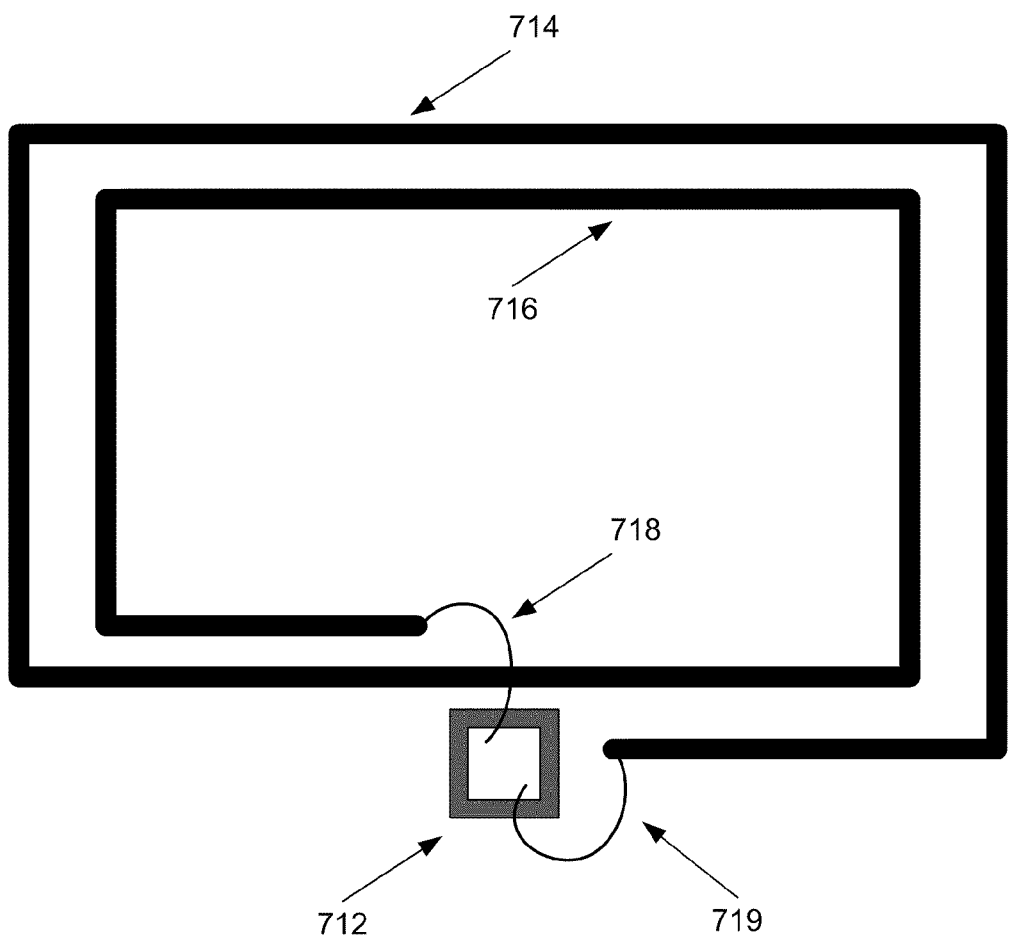
FIG. 7 illustrates an example idealized precursor prior to encapsulation according to embodiments.

FIG. 7 illustrates an example idealized precursor formed from a two-loop coil plus an RFID IC according to embodiments.

For many RFID applications a small-size, low-cost tag may be desirable. In many such cases the tag needs only a short communication range, and in these cases a small antenna may suffice to provide wireless communications between the tag and a reader. Diagram 700 illustrates an idealized RFID precursor in which RFID IC 712 is electrically coupled via jumpers 718 and 719 to inner loop 716 and outer loop 714 of a two-loop coil. The coil acts as a tuning element for the RFID IC and also as an antenna. Precursor 700 can function as a short-range RFID tag Forming precursor 700 using conventional techniques typically involves first encapsulating the IC into a package, and then attaching the package to a multilayer circuit board on which the coil antenna is formed. Embodiments provide a solution for encapsulating both the RFID IC and the coil into a package, whereby the coil is formed from the package lead frame.

By making the coil a part of the lead frame, assembly steps may be reduced. Furthermore, in embodiments where precursor 700 functions as a complete RFID tag, the small package may exhibit enhanced reliability and lower cost by removing an external antenna component and its connections. Even in embodiments where precursor 700 is attached to a larger antenna to form a long-range RFID tag, molding the RFID IC and tuning coil into a package improves robustness.

Figure 8:
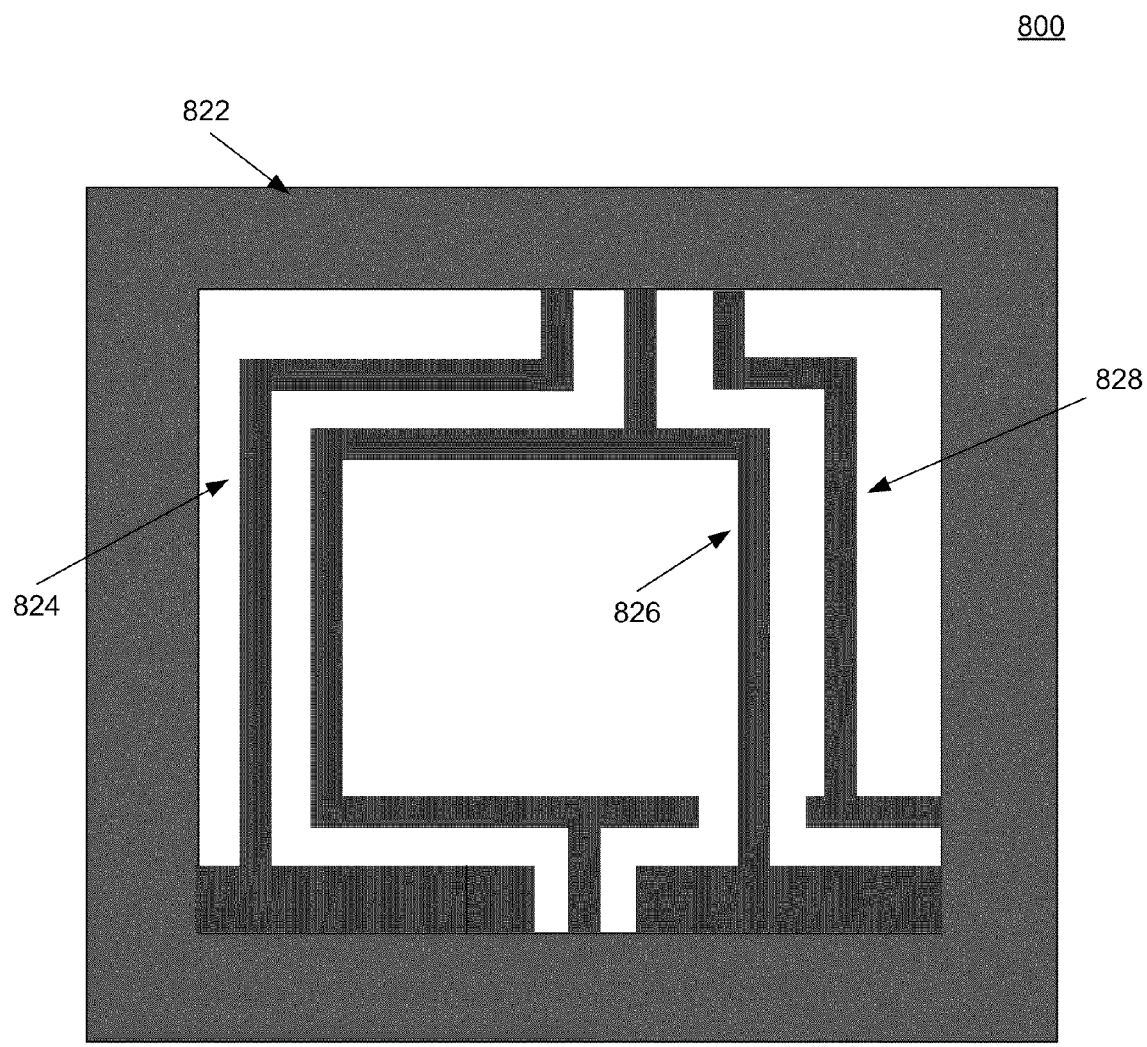
FIG. 8 illustrates an example lead frame for a two-loop RFID precursor according to embodiments.

FIG. 8 illustrates an example lead frame for a two-loop RFID precursor according to embodiments.

Lead frame 800 is an example structure for reliable and low-cost manufacture of a two-loop precursor. Lead frame 800 may be square or rectangular, and may be as small as 6×6 mm in some embodiments. Lead frame 800 includes an outer support structure 822 and segments 824, 826, and 828. Segments 824, 826, and 828 are supported during assembly by being attached to support structure 822. These segments become isolated when support structure 822 is trimmed away after the molding process. The segments have a multiple roles in the present invention. First, they are elements of the inner and outer coil loops. Second, they anchor the coil to the support structure 822 during manufacturing. Third, they may act as a mounting structure for the RFID IC. And fourth, they may be used for capacitive or conductive coupling of an external antenna(s) to the precursor. The RFID IC may be mounted at various locations on the lead frame and its antenna terminals coupled to the segments. Examples of loop formation (via jumpers) and RFID IC placement are shown below FIG. 9A through 9D illustrate various precursor configurations according to embodiments, using a lead frame like the one shown in FIG. 8.

Figure 9A:
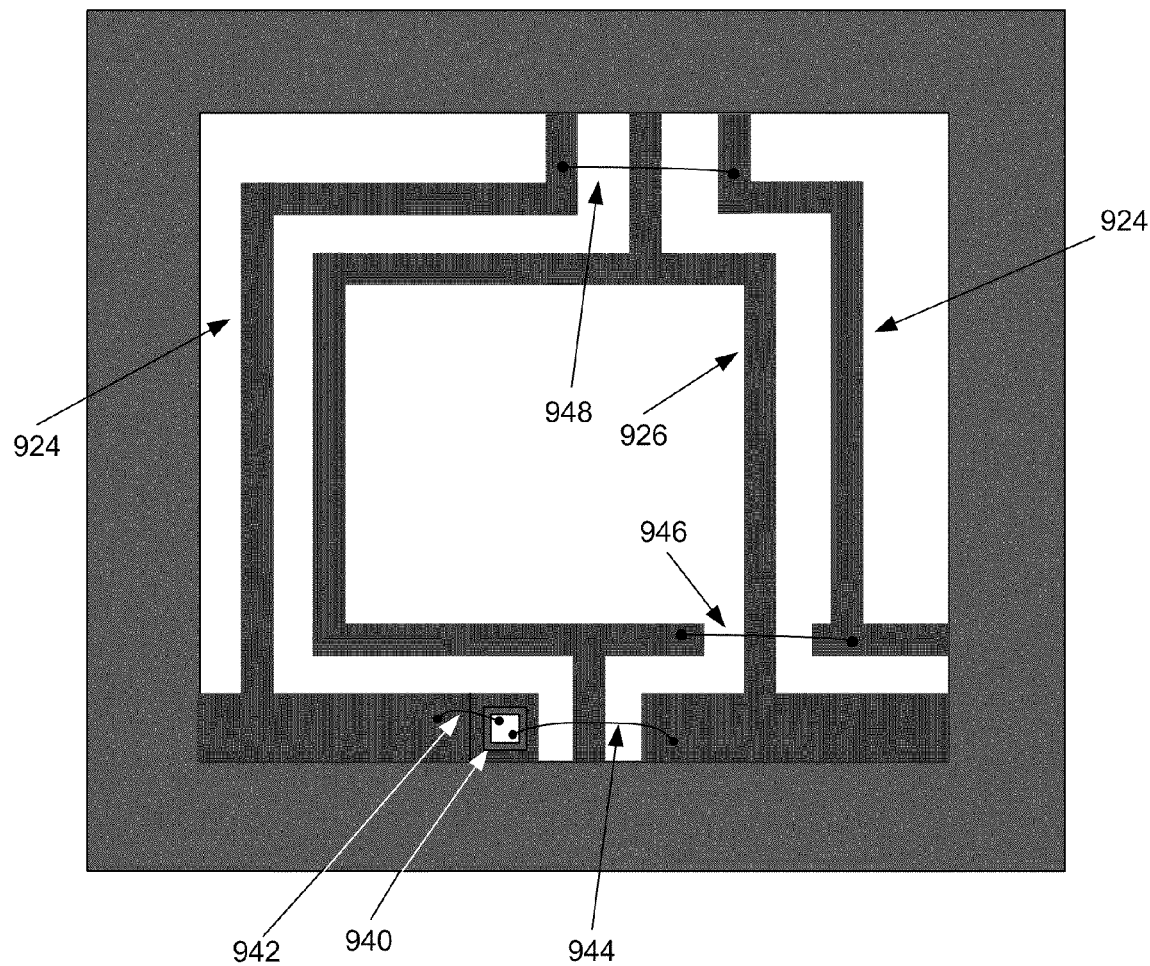
FIG. 9A through 9D illustrate various RFID IC mounting and coupling configurations for precursors according to embodiments, using a lead frame like the one shown in FIG. 8.

Precursor 900A of FIG. 9A includes outer loop segments 924, inner loop segment 926, jumpers 946 and 948 to couple the segments into a conductive two-loop coil, IC 940, and jumpers 942 and 944 to couple antenna connections of the RFID IC to segments 924 and 926. In this example configuration RFID IC 940 is mounted on outer loop segment 924. The antenna terminals of RFID IC 940 are on a top side of the IC. One terminal is connected via jumper 942 to outer loop segment 924. Another terminal is connected via jumper 944 to inner loop segment 926.

Figure 9B:
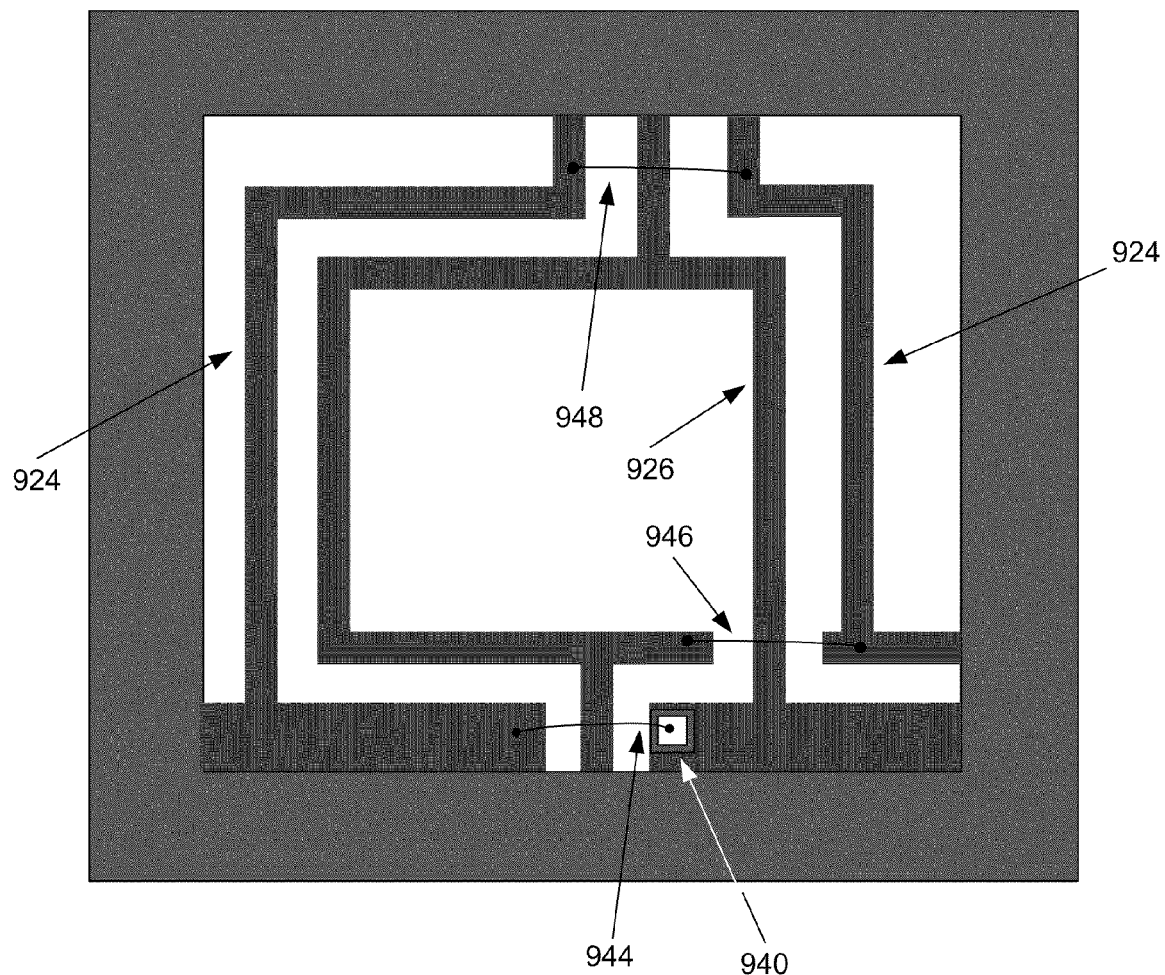

Precursor 900B of FIG. 9B has the same structure as precursor 900A with outer loop segments 924, inner loop segment 926, jumpers 946 and 948 to couple the segments into a conductive two-loop coil, and IC 940. Differently from lead frame 900A, RFID IC 940 is mounted on an end point of inner loop 926. One antenna terminal of the RFID IC is coupled to outer loop 924 via jumper 944. The other antenna terminal is on the bottom of RFID IC 940 and coupled to inner loop 926 via pad mounting.

Figure 9C:
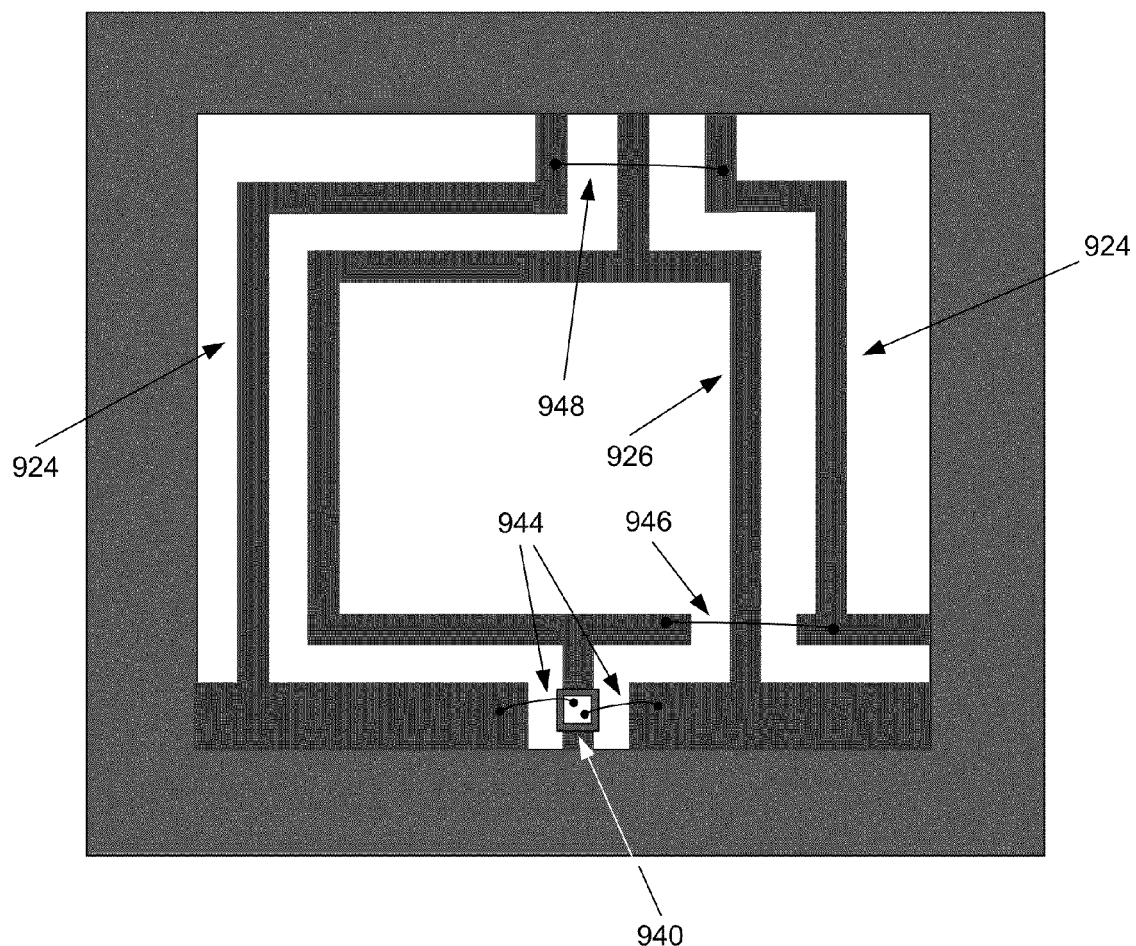

Precursor 9C of FIG. 9C has the same structure as the previous two precursors with outer loop segments 924, inner loop segment 926, jumpers 946 and 948 to couple the segments into a conductive two-loop coil, and IC 940. In this example configuration RFID IC 940 is mounted on an extrusion of inner loop 926 using a non-conductive adhesive material. The antenna terminals of RFID IC 940 are coupled to the inner and outer loops via jumpers 944.

Figure 9D:
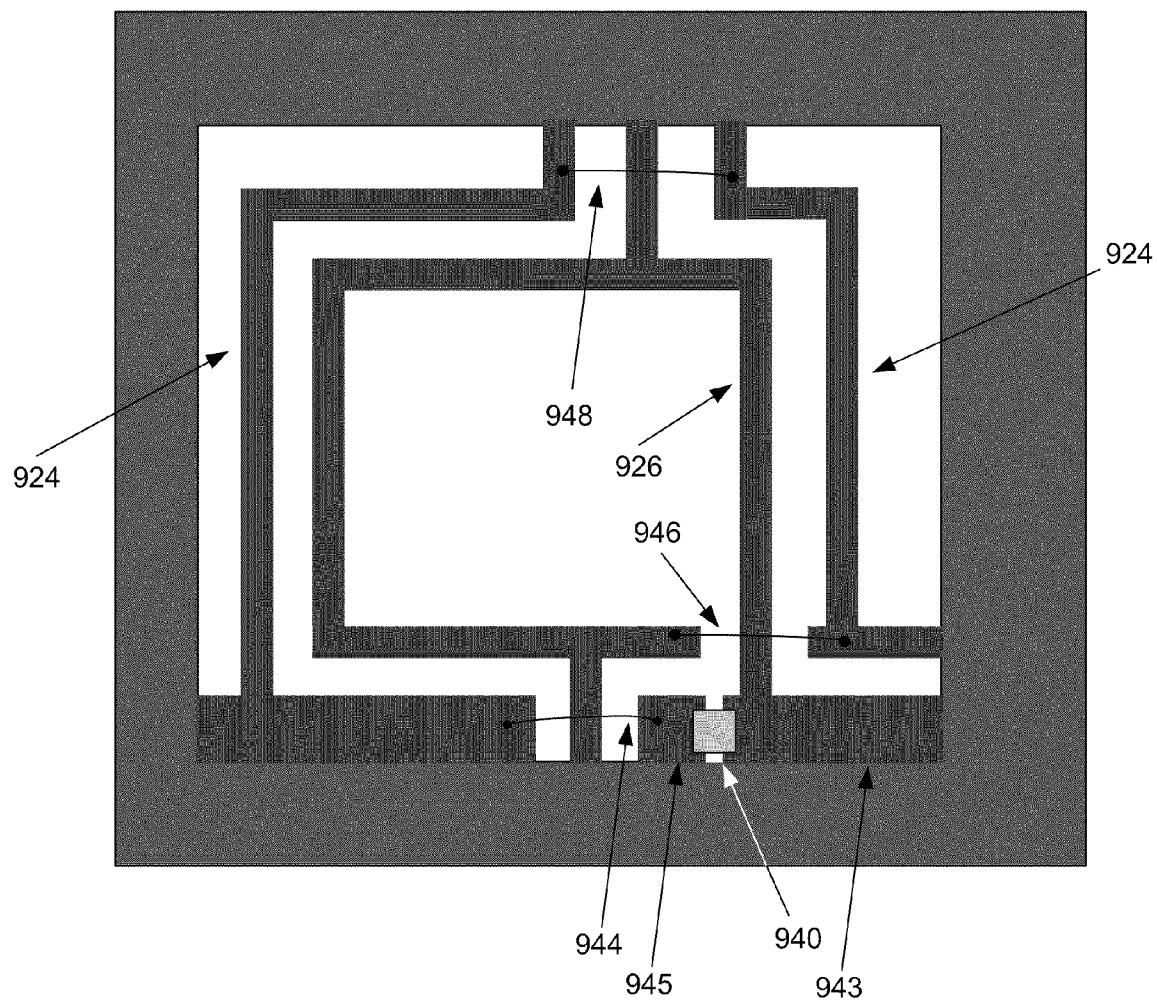

Precursor 900D of FIG. 9D has the same structure as the previous three precursors with outer loop segments 924, inner loop segment 926, jumpers 946 and 948 to couple the segments into a conductive two-loop coil, and IC 940. Differently from the previous three configurations, RFID IC 940 in this example is coupled to the coil segments via bump mounting instead of jumpers. Also referred to as a flip-chip mount, the IC's antenna terminals are connected to lead frame segments 926 and 945 by placing the IC upside-down on the segments. The bump-mount connection may be established via solder balls, conductive adhesive, or similar methods. Segment 945 couples to segments 924 via jumper 944.

The jumpers that electrically couple the segments of the lead frame together, as well as the jumpers that electrically couple the IC terminals to the segments, may be made from any type of conductive material, as described above. In some embodiments the jumpers, segments, or both may be covered with insulating material.

Embodiments are not limited to the configurations discussed above. Other placement and coupling configurations for the loops and the IC may be employed using the principles described herein. Furthermore, the antenna structure of the lead frame may be designed employing other configurations or more than two loops.

Figure 10:
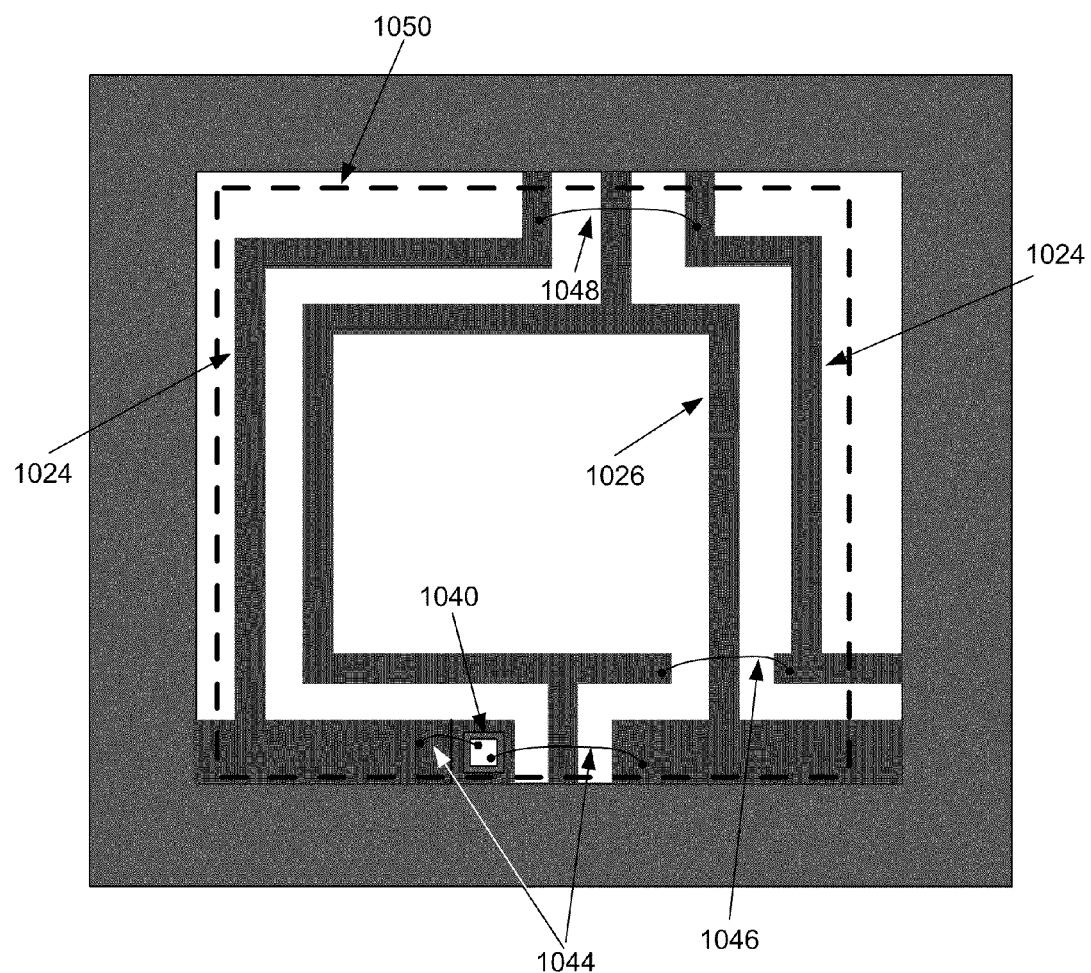
FIG. 10 illustrates the example precursor of FIG. 9A with a package trim line.

FIG. 10 adds a trim line to the example precursor of FIG. 9A. To manufacture a precursor an RFID IC is mounted on a lead frame and the jumpers are attached. Then the lead frame, RFID IC, and jumpers are encapsulated in a non-conductive material. Finally, the encapsulated precursor is trimmed along a trim line, removing the outer support structure and some of the extrusions. Trimming completes the precursor by removing the support structure, leaving a two-loop conductive coil. Of course, the RFID IC may be placed in other locations on the lead frame and coupled in different configurations as discussed previously.

Precursor 1000 shows RFID IC 1040 mounted on outer loop 1024. The antenna terminals of the RFID IC are coupled to outer loop 1024 and to inner loop 1026 via jumpers 1044. Jumper 1048 electrically couples two segments of the outer loop 1024, while jumper 1046 electrically couples the inner loop and the outer loop forming the two-loop coil. Trim line 1050 indicates the boundaries of the final precursor.

Figure 11A:
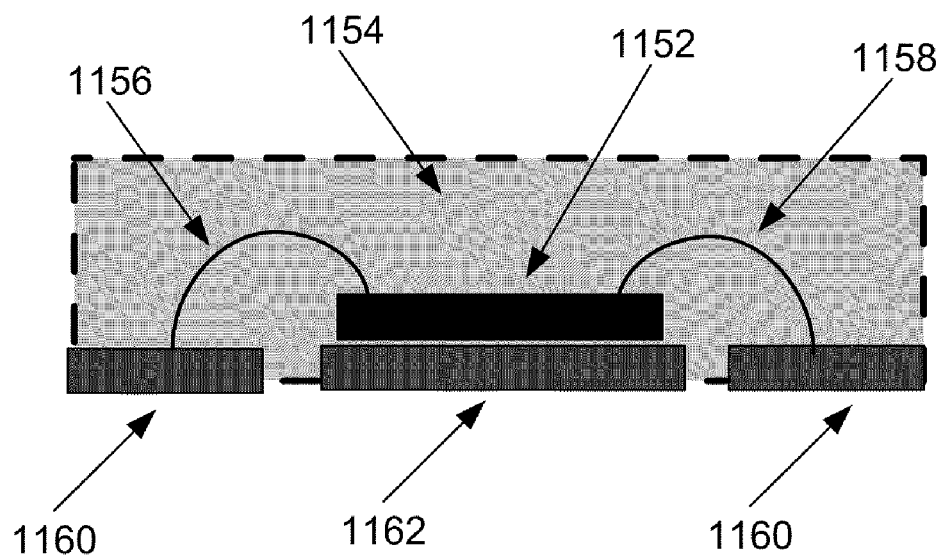
FIG. 11A illustrates a side view of an encapsulated RFID IC and lead frame with jumpers coupling the RFID IC antenna terminals to the lead-frame segments

FIG. 11A illustrates a side view of an encapsulated RFID IC showing jumpers coupling the IC terminals to lead frame segments according to embodiments.

Encapsulated RFID IC and lead frame 1100A includes RFID IC 1152, which may be mounted on a lead-frame segment 1162. The terminals of IC 1152 are electrically coupled to two segments 1160 of the lead frame via jumpers 1156 and 1158, typically made during a wire bonding stage of the manufacturing process. The lead frame segments, the IC, and the jumpers may be encapsulated in non-conductive material 1154 forming a robust and high reliability assembly. The outer portions of the lead frame may be trimmed before or after encapsulation.

Figure 11B:
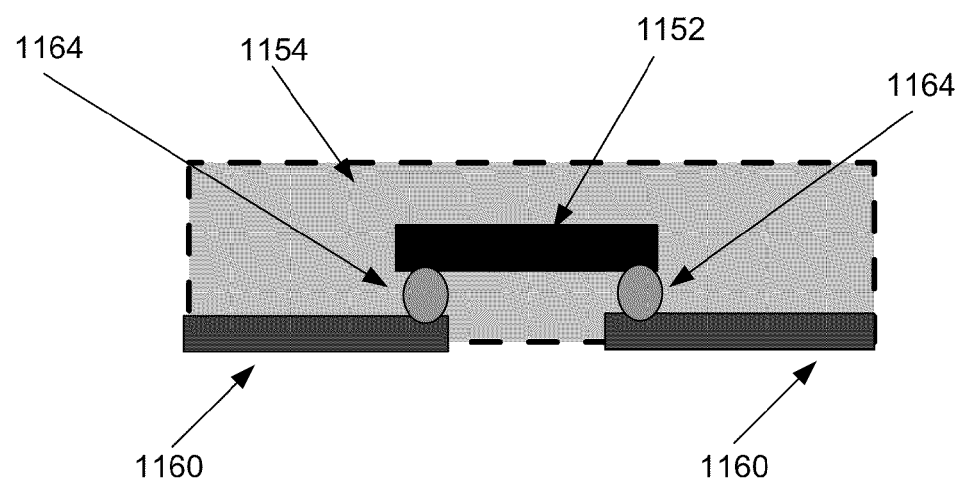
FIG. 11B illustrates a side view of an encapsulated RFID IC and lead frame with bumps of the flip-mounted IC coupling the antenna terminals to the lead-frame segments.

FIG. 11B illustrates a side view of an encapsulated RFID IC using flip-chip bump mounting to couple the IC terminals to the lead frame/segments according to embodiments.

Encapsulated RFID IC and lead frame 1100B includes RFID IC 1152, which may span two lead-frame segments 1160. The terminals of the IC are electrically coupled to the two lead-frame segments via bumps 1164, typically made during the IC-attachment stage of the manufacturing process. The lead frame segments, the IC, and the bumps may be encapsulated in non-conductive material 1154 forming a robust and high reliability assembly. The outer portions of the lead frame may be trimmed before or after encapsulation.

Figure 12:
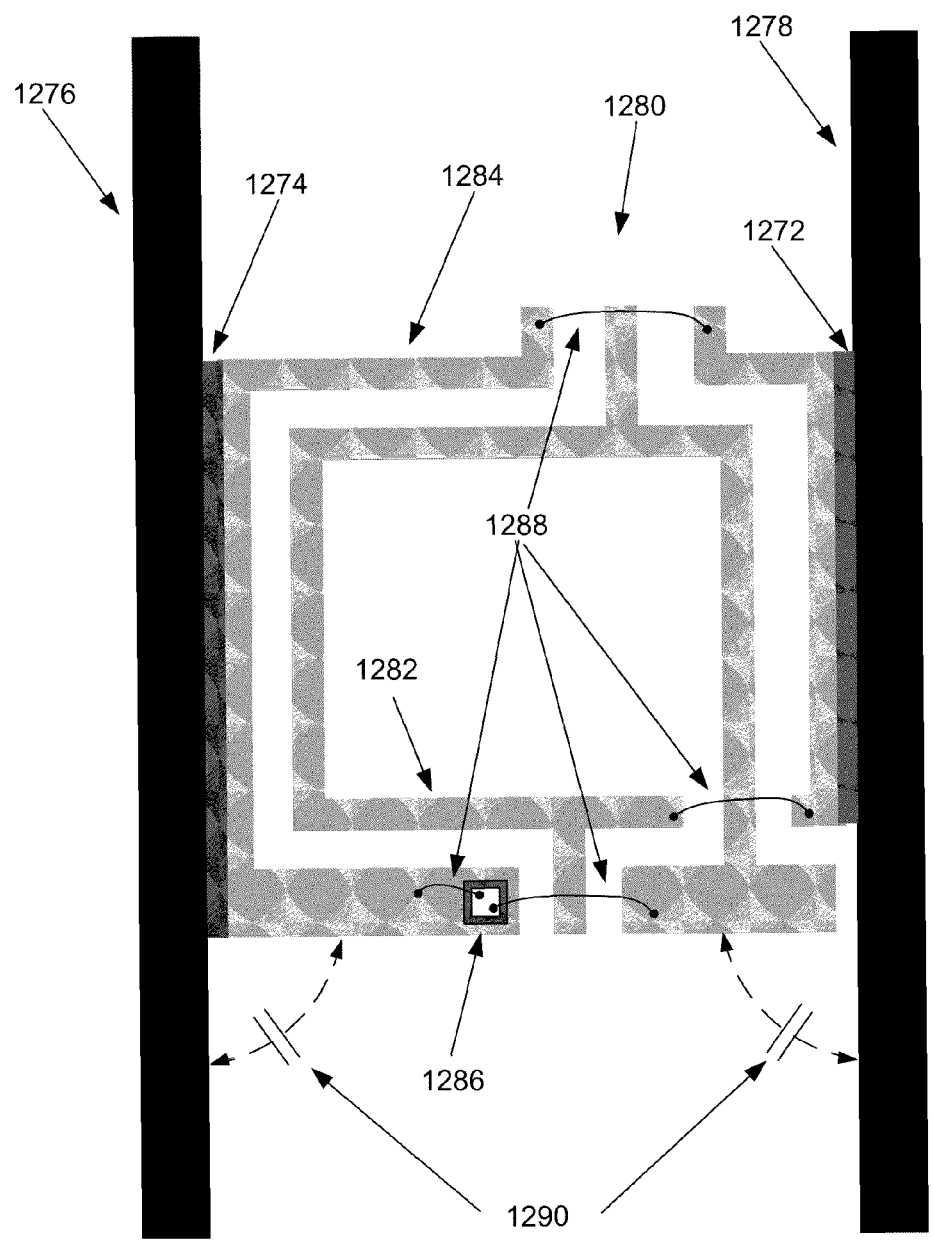
FIG. 12 illustrates a precursor according to embodiments that is coupled capacitively to two antennas.

FIG. 12 illustrates an RFID tag comprising a precursor coupled capacitively to two external antennas according to embodiments.

RFID tag 1200 comprises precursor 1280 and external antennas 1276, 1278. Precursor 1280 includes RFID IC 1286 coupled to a two-loop coil formed from inner loop 1282 and outer loop 1284. Inner loop 1282 and the outer loop 1284 are formed by electrically coupling segments of a lead frame through jumpers 1288. The antenna terminals of IC 1286, which is mounted on one of the lead-frame segments similar to the configuration in FIG. 9A, are also coupled to the segments (and thereby to the two-loop coil) through jumpers 1288.

Antennas 1276 and 1278 are capacitively coupled to outer loop 1284 through dielectric elements 1272 and 1274. The dielectric material can be the precursor encapsulation or a material external to the precursor. The antenna-to-coil capacitive coupling is represented by equivalent capacitors 1290. As discussed previously, precursor 1280 can be trimmed to expose conductive portions of the lead-frame segments, such as outer coil 1284, to the outside world, thereby also allowing conductive coupling to antennas according to other embodiments. Of course, the antennas may be coupled to other portions of the outer loop or to the inner loop. The antennas 1276 and 1278 are shown as portions of idealized dipoles, however, embodiments are not limited to dipoles. Any antenna such as a dipole, a monopole, a loop, a patch, or a slot antenna may be used with a precursor as described herein.

Embodiments also include methods. Some are methods of operation of an RFID reader or RFID reader system. Others are methods for controlling an RFID reader or an RFID reader system. These methods can be implemented in any number of ways, including the structures described in this document. One such way is by machine operations, of devices of the type described in this document.

Another optional way of implementing these methods is for one or more of the individual operations of the methods to be performed in conjunction with one or more human operators performing some of them. These operators need not be collocated with each other, but each can be with a machine that performs a portion of a program or operation.

Figure 13:
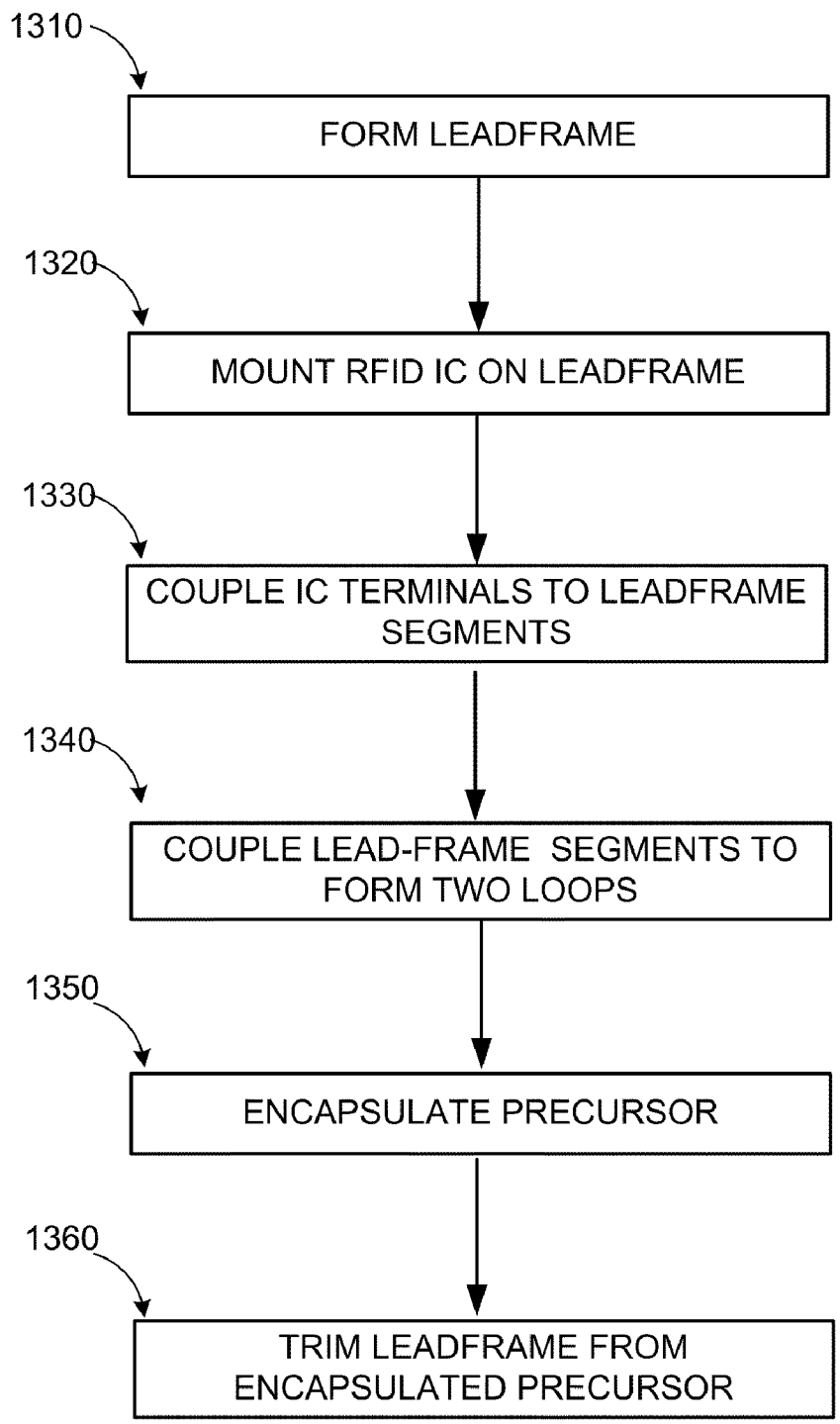
FIG. 13 illustrates a flowchart for a process for manufacturing a precursor according to embodiments.

FIG. 13 illustrates a flowchart for a process 1300 of manufacturing a precursor according to embodiments. Process 1300 may be implemented by a manufacturing system which may include one or more assembly, processing, and control devices for handling various steps of the process.

Process 1300 begins at operation 1310, where a lead frame is formed. The lead frame may include a support structure and three or more segments with each segment attached to the support structure. At operation 1320, an RFID IC may be mounted on the lead frame. The RFID IC may be mounted on the support structure or on one of the segments as described previously. At operation 1330, the terminals of the RFID IC may be electrically coupled to the lead-frame segments as described previously.

At operation 1340, the lead frame segments may be coupled together through two or more jumpers to form a two (or more) loop coil. This operation is followed by operation 1350, where the precursor comprising the RFID IC and the loop structure is encapsulated in a non-conductive material. Finally, in operation 1360, a portion of the support structure is trimmed.

The operations described in process 1300 are for illustration purposes only. A precursor including an RFID IC and a coil may be fabricated in other ways employing additional or fewer operations and in different orders using the principles described herein.

A precursor for an RFID tag according to some embodiments may include a conductive lead frame with at least three segments and an RFID IC mounted on at least one of the segments, where antenna terminals of the RFID IC are electrically coupled to at least two of the segments, and the segments are electrically coupled by at least two jumpers such that the electrically coupled segments form a two-turn coil between the antenna terminals of the RFID IC.

The terminals of the RFID IC may be coupled to the segments via jumpers, bump mounting, pad mounting to the back of the RFID IC, or a combination thereof. The precursor may be encapsulated in a non-conductive material. The lead frame may include a support structure that is trimmed after manufacturing. The precursor may be coupled to at least one external antenna via conductive coupling or via a capacitance formed by separating a region of the precursor from a region of the external antenna by a dielectric.

According to other embodiments, an RFID tag may include a precursor as described above and at least one external antenna coupled to at least one of the segments of the lead frame. The precursor may be mounted on a polyethylene terephthalate (PET) substrate or on a printed-circuit-board (PCB). In some embodiments the external antenna is also on the PET substrate or PCB.

According to other embodiments, an RFID tag may include a precursor and two antennas, where the antennas are coupled via conductive coupling or capacitive coupling to an outer loop of the two-turn coil of the precursor. The antennas may be a dipole, a monopole, a loop, a patch, or a slot.

According to other embodiments, an RFID tag includes a precursor and at least one antenna. The precursor may be encapsulated in a non-conductive material. The precursor and antenna may be together encapsulated in a non-conductive material.

According to further embodiments, a method for manufacturing a precursor may include forming a conductive lead frame with at least three segments, where the segments are attached to a support structure; mounting an RFID IC on at least one of the segments; electrically coupling antenna terminals of the RFID IC to at least two of the segments; and electrically coupling the segments to each other via at least two jumpers such that the electrically coupled segments form a two-turn coil between the antenna terminals of the RFID IC.

The method may further include encapsulating a precursor comprising the lead frame, the support structure, and the RFID IC in a non-conductive material; and trimming off the support structure. The method may also include attaching at least one antenna to the precursor such that the antenna is coupled to the two-turn coil or to the RFID IC via conductive coupling or capacitive coupling.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented (e.g. according to embodiments formed), individually and/or collectively, by a wide range of hardware, software, firmware, or virtually any combination thereof. Those skilled in the art will recognize that some aspects of the tag embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A precursor for a Radio Frequency Identification (RFID) tag, comprising:
   a conductive lead frame having at least three segments;
   an RFID Integrated Circuit (IC) including at least two antenna terminals; and
   at least two jumpers, wherein
      the RFID IC is mounted on at least one of the segments,
      the at least two antenna terminals are electrically coupled to at least two of the segments, and
      the at least two jumpers electrically couple the segments such that the coupled segments form a two-turn coil between the antenna terminals of the RFID IC.

2. The precursor of claim 1, wherein the at least two antenna terminals are coupled to the at least two segments through at least one of: jumpers, pad mounting, and bump mounting.

3. The precursor of claim 2, wherein the RFID IC is mounted on at least two of the segments, and the mounting is bump mounting.

4. The precursor of claim 1, wherein the precursor is encapsulated in a non-conductive material.

5. The precursor of claim 4, wherein the lead frame further includes a support structure that is arranged to be trimmed after encapsulation.

6. The precursor of claim 5, wherein the precursor exposes at least one conductive lead after encapsulation.

7. The precursor of claim 6, wherein the at least one conductive lead is coupled to at least one antenna via one of: conductive coupling and a capacitance formed by separating the conductive lead from a region of the antenna by a dielectric.

8. A Radio Frequency Identification (RFID) tag, comprising:
   a precursor comprising:
      a conductive lead frame having at least three segments;
      an RFID Integrated Circuit (IC) including at least two antenna terminals; and
      at least two jumpers, wherein
         the RFID IC is mounted on at least one of the segments,
         the at least two antenna terminals are electrically coupled to at least two of the segments, and
         the at least two jumpers electrically couple the segments such that the coupled segments form a two-turn coil between the antenna terminals of the RFID IC; and
   at least one antenna coupled to at least one of the segments of the lead frame.

9. The RFID tag of claim 8, wherein the precursor is mounted on one of a polyethylene terephthalate (PET) substrate and a printed-circuit-board.

10. The RFID tag of claim 8 comprising two antennas, wherein the antennas are coupled to an outer loop of the two-turn coil of the precursor via one of: conductive coupling and capacitive coupling.

11. The RFID tag of claim 8, wherein the at least one antenna is coupled to an inner loop of the two-turn coil of the precursor via one of: conductive coupling and capacitive coupling.

12. The RFID tag of claim 8, wherein the antenna includes one of: a dipole, a monopole, a loop, a patch, and a slot.

13. The RFID tag of claim 8, wherein the precursor is encapsulated in a non-conductive material.

14. The RFID tag of claim 8, wherein the precursor and the antenna are encapsulated in a non-conductive material.

15. A method for manufacturing a precursor for a Radio Frequency Identification (RFID) tag, comprising:
   forming a conductive lead frame with at least three segments, wherein the segments are attached to a support structure;
   mounting an RFID Integrated Circuit (IC) with at least two antenna terminals on at least one of the segments;
   electrically coupling the at least two terminals of the RFID IC to at least two of the segments;
   electrically coupling the segments to each other via at least two jumpers such that the electrically coupled segments form a two-turn coil between the antenna terminals of the RFID IC.

16. The method of claim 15, further comprising:
   encapsulating the precursor in a non-conductive material; and
   trimming off the support structure.

17. The method of claim 16, wherein the precursor exposes at least one conductive lead after encapsulation.

18. The method of claim 17, further comprising:
   attaching at least one antenna to the precursor such that the at least one antenna is coupled to the conductive lead through one of: conductive coupling and a capacitance formed by separating the conductive lead from a region of the antenna by a dielectric.

19. The method of claim 18, further comprising:
   encapsulating the precursor and the attached at least one antenna in a non-conductive material.

20. The method of claim 15, wherein mounting the RFID IC on at least one of the segments includes: coupling one antenna terminal of the RFID IC to one segment via one of: a jumper, pad mounting, and bump mounting.

* * * * *